A. G. BIEGEL.
LENS CUTTING INSTRUMENT.
APPLICATION FILED JUNE 1, 1914.
1,122,247.
Patented Dec. 29, 1914.
2 SHEETS—SHEET 1.
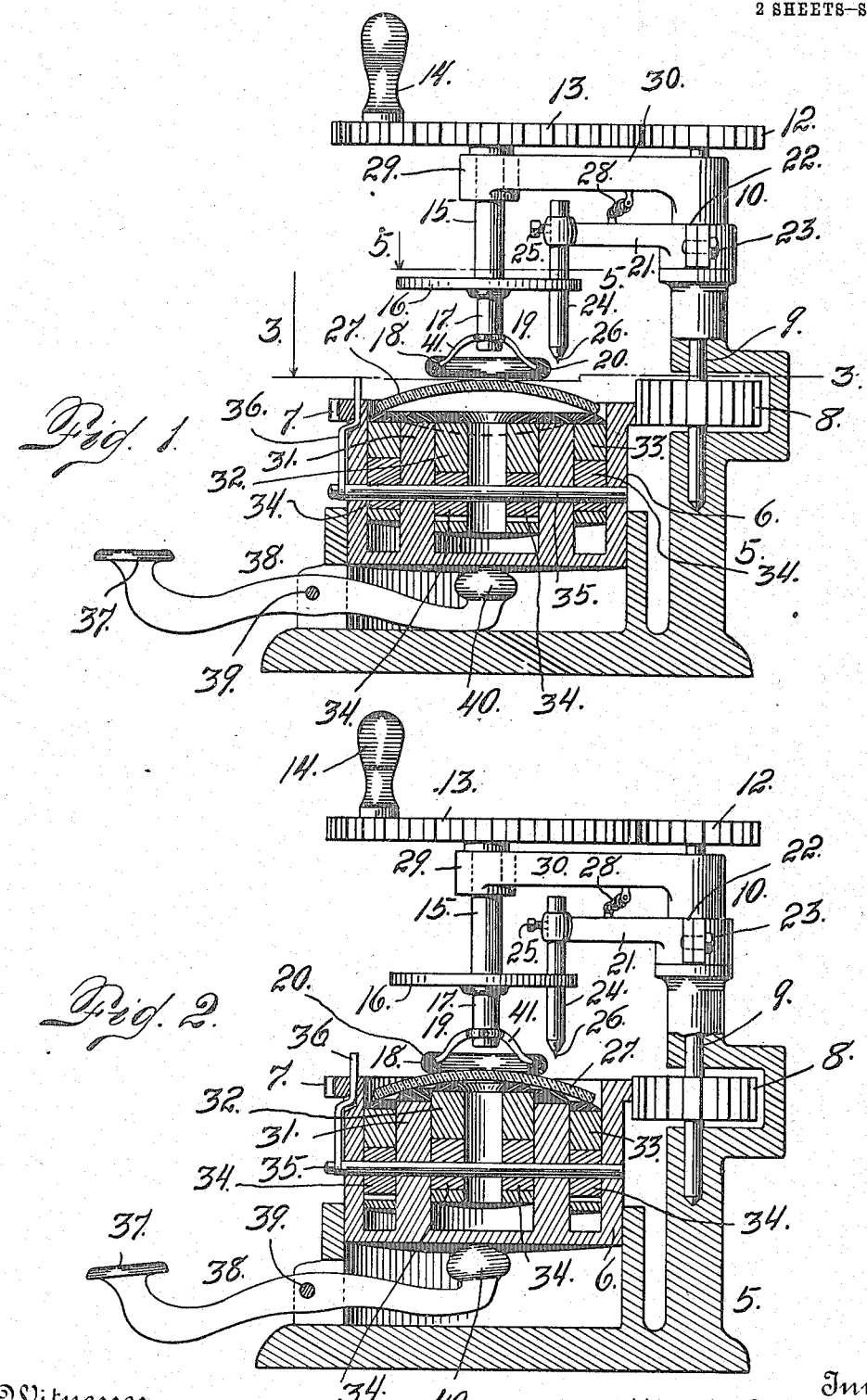
Witnesses
Otto E. Hoddick
L. E. Petersen.
Inventor
Albert G. Biegel.
By A. J. O'Brien
Attorney

A. G. BIEGEL.
LENS CUTTING INSTRUMENT.
APPLICATION FILED JUNE 1, 1914.

1,122,247.

Patented Dec. 29, 1914.

2 SHEETS—SHEET 2.

Witnesses
Otto E. Hoddick.
L. E. Petersen.

Inventor
Albert G. Biegel.
By
Attorney

UNITED STATES PATENT OFFICE.

ALBERT G. BIEGEL, OF DENVER, COLORADO.

LENS-CUTTING INSTRUMENT.

1,122,247.
Specification of Letters Patent.
Patented Dec. 29, 1914.

Application filed June 1, 1914. Serial No. 842,006.

*To all whom it may concern:*

Be it known that I, ALBERT G. BIEGEL, citizen of the United States, residing in the city and county of Denver and State of Colorado, have invented certain new and useful Improvements in Lens-Cutting Instruments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in lens cutting instruments, the invention having special relation to the portion of the instrument for supporting the lens during the cutting operation.

Furthermore, the object of the invention is to make it practicable to cut lenses which are concave or concavo-convex, or the reverse, as the case may be, or double convex as well as lenses of all kinds having curved surfaces, without danger of breaking the lens due to the pressure of the cutting instrument.

Heretofore, so far as I am aware, no instrument has been devised whereby provision is made for properly supporting the concave surface of the lens during the cutting operation. The construction of my improvement is such that with the concave surface of the lens lowermost, practically its entire area is in contact with the supporting device, except at the very center of the lens where there is practically no strain during the cutting operation.

An exceedingly important feature of my improvement lies in its adjustability to lenses of varying curvatures.

Having briefly outlined the invention, I will describe the same in detail, reference being made to the accompanying drawing, in which is illustrated an embodiment thereof.

Figure 3:
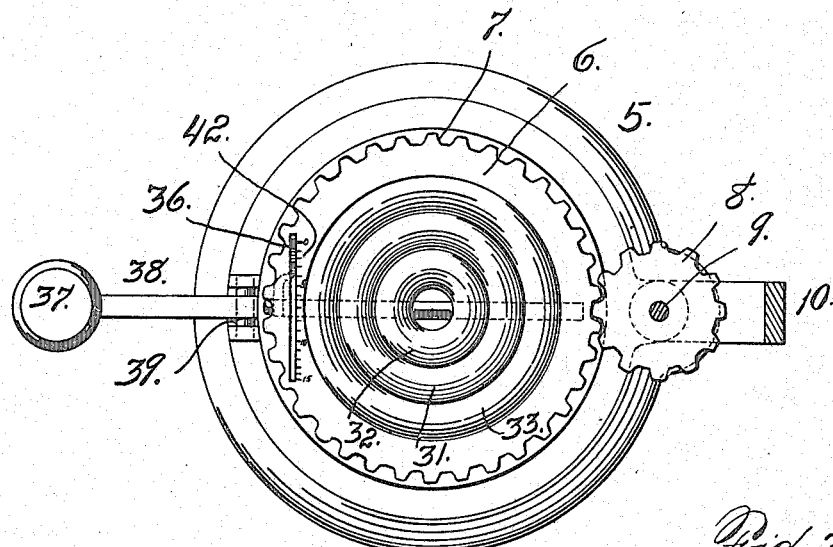
Figure 4:
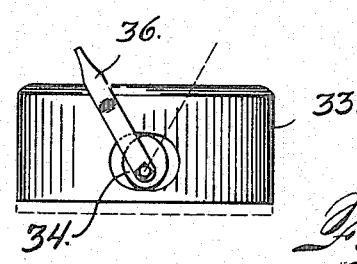
Figure 5:
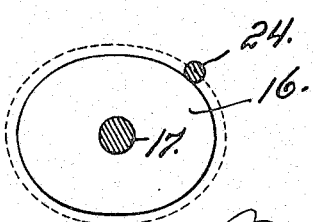

In this drawing,—Figure 1 is a view of a lens cutting instrument equipped with my improvement, the novel features being shown in section. Fig. 2 is a similar view, showing the parts of the supporting device adjusted for lens cutting purposes. Fig. 3 is a top plan view of the lens supporting feature of the device, being a view looking in the direction of the arrow in Fig. 1 in a plane indicated by the line 3—3, a portion of the instrument being sectioned on the said line. Fig. 4 is an elevation of the lens supporting feature of the instrument, shown in detail. Fig. 5 is a section taken on the line 5—5, Fig. 1, looking downwardly.

The same reference characters indicate the same parts in all the views.

Let the numeral 5 designate a suitable supporting frame in which is mounted a vertically movable casing 6, provided with a gear 7 at its upper extremity, the said gear meshing with a small gear 8 fast on a spindle 9 journaled in an upwardly projecting arm 10 of the flange. This spindle extends above the arm 10 and its upper extremity is equipped with a pinion 12, meshing with an operating gear 13 provided with a handle 14. The gear 13 is made fast to the upper extremity of a spindle 15 upon which is mounted a guide 16 which is approximately elliptical in shape or the shape of the lens in outline after it has been cut. The spindle 16 has an extension 17 below the guide which carries a resilient or elastic ring 18, which is connected with the spindle extension by a spider frame 19, having a metal ring 20 which forms a core for the exterior rubber portion of the ring member 18.

Mounted upon the arm 10 of the frame and rotatably movable thereon, is an arm 21 which is provided at one extremity with a two part bearing 22, the parts of the bearing being connected by bolts or cap screws 23. The opposite extremity of this arm is equipped with a pin or small rod 24, being vertically adjustable on the arm by a set bolt 25. The lower extremity of this device is provided with the diamond 26 or other device which is brought in direct contact with the lens 27 for cutting purposes. The arm 21 is connected with the stationary frame by means of a spiral spring 28 whereby the arm, together with the cutting device 24, is allowed to move in response to the action of the guide during the cutting operation. In other words, by virtue of the spring 28, the pin 24 carrying the cutter 26 is held constantly in engagement with the outer edge of the guide member 16, thus causing the cutter to engage the lens in a path conforming to the shape of the outer edge of the guide 16; and as this guide is of the shape of the lens to be cut, the latter must, of course, be of the desired shape or external outline.

The spindle 15 is journaled in the extremity 29 of an arm 30, which is stationary and as shown in the drawing, formed integral with the upright member 10.

Extending upwardly from the bottom of the casing 6, is an annular sleeve 31 in which is fitted a centrally located vertically movable sleeve 32; while surrounding the stationary sleeve 31 is a second vertically movable sleeve 33. The walls of the two movable sleeves 32 and 33 are provided with openings in which are located eccentric cams 34, which are fast on a spindle 35, the latter being journaled in the casing 6, and the walls of the stationary sleeve 31. The outer extremity of this spindle is equipped with an arm 36 for operating the spindle for the purpose of adjusting the cams 34, whereby the sleeves 32 and 33 are properly adjusted to form an oval support adapted to conform to the concavity of the lens 27, as best illustrated in Fig. 2. From this it will be understood that when it is desired to adjust the supporting device to cause its upper surface to conform to the concavity of the lens to be cut, the spindle 35 will be actuated to cause the cams 34 of the two sleeves 32 and 33 to raise the sleeve 32 and lower the sleeve 33, the cams being so arranged as to properly perform this function, and also in such manner that the upper surface of the supporting device shall conform to the varying concavity or convexity of different lenses within the necessary range, whereby a single supporting device of this kind may be employed for cutting all lenses, as glass plates of any kind having a curved surface or curved surfaces.

From the foregoing description, the use and operation of my improved lens cutting instrument will be readily understood.

After the lens is put in place as illustrated in Fig. 1, the casing member 6 may be raised by pressing downwardly on the outer extremity 37 of a lever 38, which is fulcrumed on the frame as shown at 39. The inner extremity 40 of this lever bears against the center of the bottom of the casing 6. Consequently, as the outer extremity of this lever is depressed, the casing 6, together with the lens, will be raised into engagement with the resilient ring 18, sufficient pressure being used to retain the lens properly in place. Then, by moving the spindle 35 by the use of the hand lever 36, the sleeves 32 and 33 may be adjusted to properly support the lens on its under surface, as illustrated in Fig. 2. Then, by further pressure on the outer extremity of the lever 38, the lens may be tightly clamped between the supporting device from underneath and the resilient ring from above, during the cutting operation, which is performed by turning the operating gear 13, which, by virtue of its meshing connection with the gear 12, serves to rotate the spindle 9, its gear 8 and the external gear 7, which is formed integral with the casing 6 carrying the supporting sleeves of the instrument, as heretofore explained. After the lens has been clamped in place as just explained, the pin 24 carrying the cutter 26 is lowered by loosening the set screw 25 to allow the cutting point to engage the lens in the cutting relation. Then, as the guide 16 is rotated with the supporting device, the resilient ring and the lens, the lens will be cut in a path conforming to the shape of the outer edge of the guide, since, through the medium of the spring 26, the pin 24 of the cutting device is held constantly in engagement with the outer edge of the guide, thus causing the cutting point 26 to cut the lens to conform to the outline of the guide.

The upper extremities of the stationary sleeve 31 and the movable sleeves 32 and 33 are equipped with some resilient elastic or yielding material, as soft rubber, the same being designated by the numeral 41.

In order to guide the operator in adjusting the spindle 35 carrying the eccentric cams, in order to adjust the movable sleeves so that their upper edges in conjunction with the corresponding edge of the stationary sleeve, may properly conform to the varying curvatures of the lenses to be cut, the casing is provided adjacent the upper extremity of the lever arm 36, with a scale 42, properly graduated or marked with suitable sub-divisions for the purpose, the indicia employed being in terms to indicate lens curvatures. The graduations, of course, may be in any other terms or denominations that may be found practicable or desirable.

Attention is called to the fact that when the sleeves of the instrument are in the position shown in Fig. 1, if it is desired to adjust the lens supporting feature to cause the upper surface of the sleeves to conform to the shape of a convex lens or other glass plate which it may be desired to cut, by a proper movement of the lever 36, whereby the sleeves are depressed, their upper surfaces may be made to conform to the depression indicated by the dotted line in Fig. 1, or, in other words, made to conform to the shape of a convex surface, as, for instance, when a plano-convex or a double convex lens or other piece of glass is to be cut. From this it will be observed that my improved instrument is capable of adjustment for use in cutting relatively brittle material of all kinds, whether one or both surfaces are curved.

Having thus described my invention, what I claim is,—

1. A lens cutting instrument provided with a support composed of a number of parts adjustable to produce surfaces adapted to conform with the varying curvatures of the lenses to be cut.

2. A lens cutting instrument comprising a casing provided with a number of concentrically arranged sleeves, and means for adjusting the same in the direction of their axes to cause the sleeve extremities to form surfaces of varying curvature.

3. A lens cutting instrument comprising a casing provided with a number of concentrically arranged sleeves, and means for adjusting the same in the direction of their axes to cause the sleeve extremities to form surfaces of varying curvature, the said extremities being equipped with resilient material.

4. A device of the character described, composed of a casing provided with a stationary sleeve and having a number of concentrically arranged movable sleeves coöperating with the stationary sleeve, and means for adjusting the movable sleeves to cause their extremities to form with the extremity of the stationary sleeve, surfaces of varying curvature, for the purpose set forth.

5. A lens supporting device, composed of a casing carrying a number of concentrically arranged sleeves, a spindle passing through openings formed in the sleeves and equipped with cams engaging the said openings, and adjustable through the medium of the spindle to cause the sleeves to occupy different positions, whereby a surface may be produced to approximately fit the curvature of the lenses.

6. A device of the class described, comprising a casing having a stationary sleeve and a number of concentrically arranged movable sleeves coöperating with the stationary sleeve, a spindle journaled in the wall of the casing and the stationary sleeve and passing through openings formed in the movable sleeves, the spindle being equipped with cams which fit the openings in the movable sleeve, and means connected with the spindle to facilitate its manual adjustment for the purpose of regulating the movable sleeves so that their exposed extremities, in conjunction with the corresponding extremity of the stationary sleeve, approximately fit lenses of varying curvatures.

7. A lens cutting instrument provided with a casing movable both vertically and rotatably, the said casing carrying a number of members adjustably mounted to cause their upper extremities which are exposed, to conform approximately to varying curvatures, for the purpose set forth.

8. The combination with a stationary frame, of a casing vertically movable in said frame, the said casing being also rotatably mounted, a number of concentrically arranged sleeves mounted in the casing and vertically movable to cause their upper extremities which are exposed, to occupy different planes, the casing being equipped with a gear, and suitable means coöperating with the said gear for rotating the casing, and means also carried by the frame and coöperating with the vertical movement of the casing for clamping the lens in place upon the supporting extremities of the sleeves, the said clamping means being arranged to rotate in harmony with the casing, and being also equipped with a guide and a spring held cutting device, engaging the guide and adapted to act upon the lens, substantially as described.

In testimony whereof I affix my signature in presence of two witnesses.

ALBERT G. BIEGEL.

Witnesses:
 MAZE KIRBY,
 A. EBERT O'BRIEN.